(12) United States Patent
Unsworth

(10) Patent No.: US 6,606,431 B2
(45) Date of Patent: Aug. 12, 2003

(54) METHOD FOR CREATING SIDE FIRING OR LEAKY OPTICAL FIBERS

(76) Inventor: John D. Unsworth, C/O Vasotech Corp. 7 Innovation Dr. Suite 107, Flamborough Ontario (CA), L9H 7H9

( * ) Notice: Subject to any disclaimer, the term of this patent is extended or adjusted under 35 U.S.C. 154(b) by 0 days.

(21) Appl. No.: 09/933,132

(22) Filed: Aug. 21, 2001

(65) Prior Publication Data

US 2002/0037133 A1 Mar. 28, 2002

Related U.S. Application Data

(60) Provisional application No. 60/226,937, filed on Aug. 22, 2000.

(51) Int. Cl.[7] ............................... G02B 6/26; G02B 6/00
(52) U.S. Cl. ........................................ 385/31; 385/147
(58) Field of Search ........................... 385/31–37, 140, 385/147; 250/559.1, 205, 208.5, 559.45; 600/585, 434; 604/95, 96, 280; 356/4.01, 141.1–141.4

(56) References Cited

U.S. PATENT DOCUMENTS

| | | | | |
|---|---|---|---|---|
| 5,290,278 A | * | 3/1994 | Anderson | 606/15 |
| 5,625,196 A | * | 4/1997 | Williams | 250/205 |
| 5,904,657 A | * | 5/1999 | Unsworth et al. | 600/434 |
| 6,433,483 B1 | * | 8/2002 | Michael et al. | 315/200 A |

FOREIGN PATENT DOCUMENTS

| | | | |
|---|---|---|---|
| EP | 0745917 | * 12/1996 | |
| JP | 63-199303 | * 8/1988 | 250/205 |

* cited by examiner

Primary Examiner—Akm E. Ullah

(57) ABSTRACT

Means for creating side-firing optical fibers in large numbers and providing means for controlling the amount and frequency of radiation passes through the sides of the fiber. Also means for switching and channeling radiation through the sides of the fibers is disclosed and methods for strengthening the treated and untreated portions of the fiber.

6 Claims, 3 Drawing Sheets

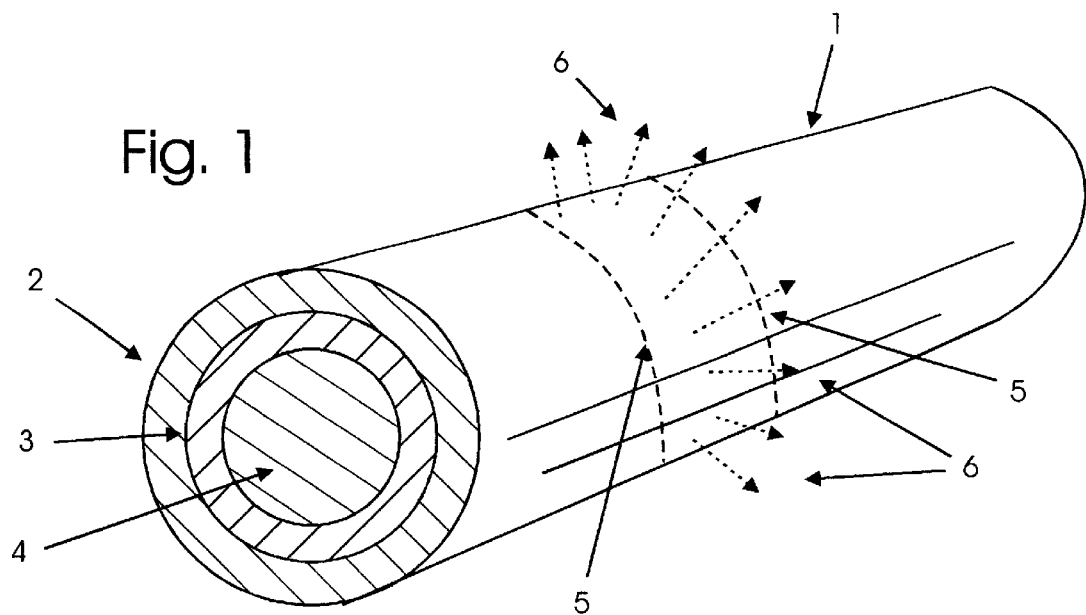
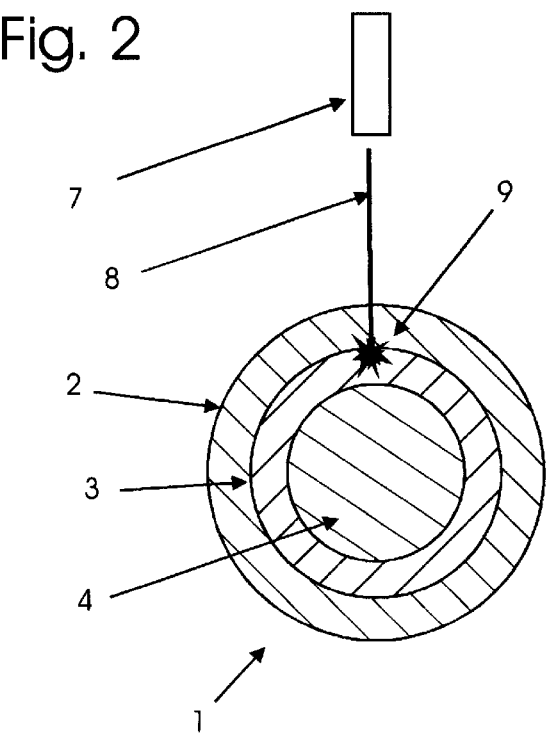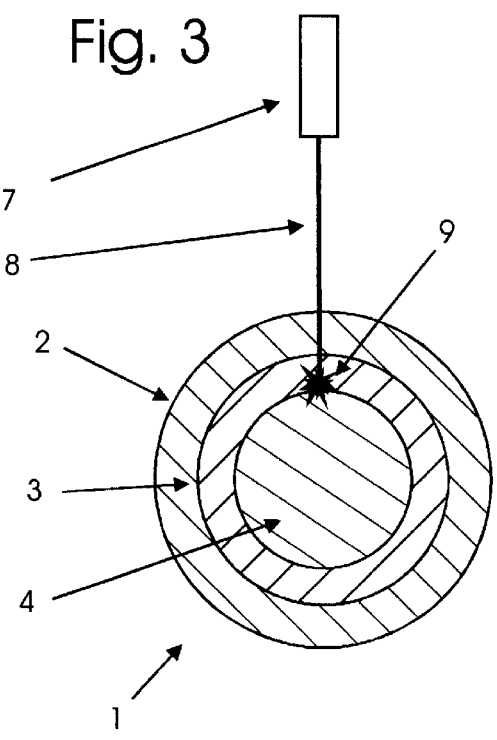

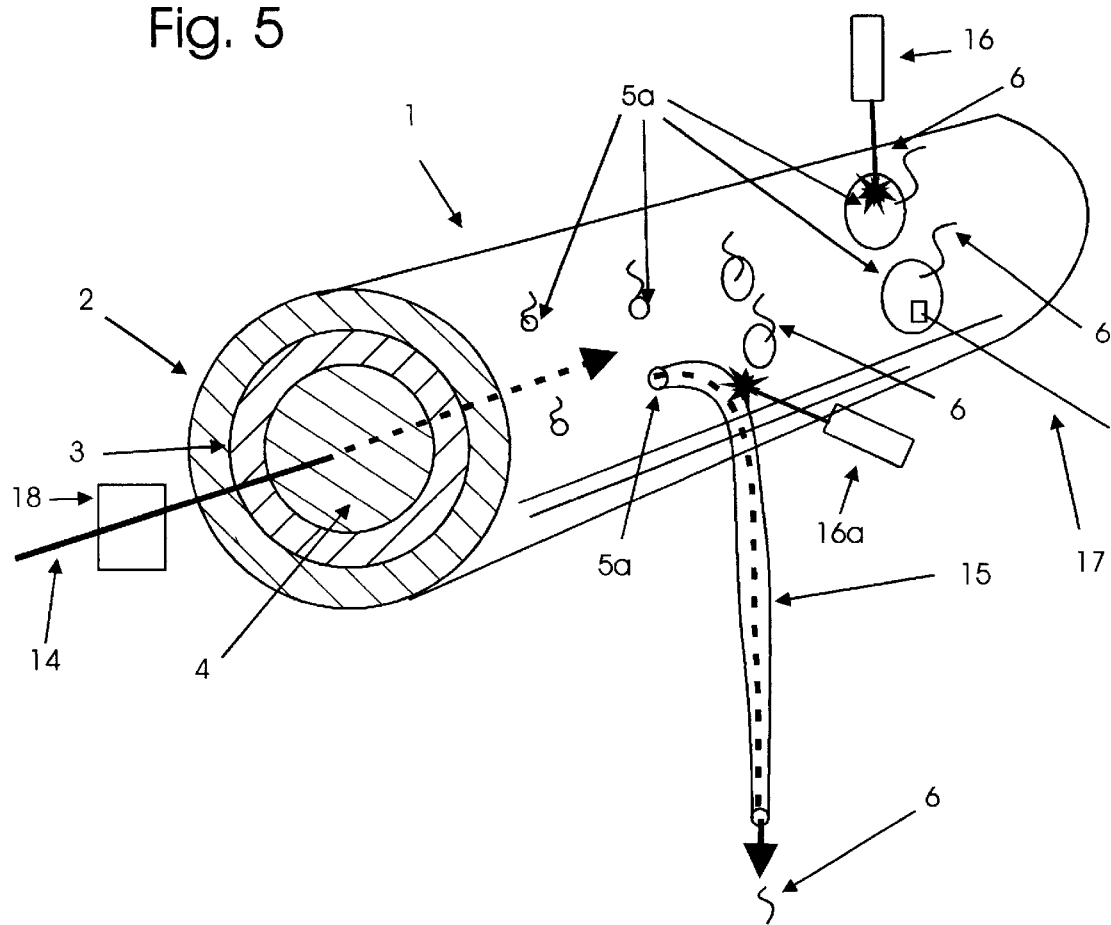

METHOD FOR CREATING SIDE FIRING OR LEAKY OPTICAL FIBERS

This application claims the benefit of provisional application No. 60/226,937 filed Aug. 22, 2000.

FIELD OF THE INVENTION

The field of the invention is optical fibers.

BACKGROUND AND SUMMARY OF THE INVENTION

Optical fibers are used to direct light of various light frequencies along an optically transparent material. They are typically comprised of a core, cladding and buffer or coating. The core, is at the core of the fiber and like the other two constituents runs parallel to the longitudinal axis of the fiber. The cladding surrounds the sides of the core and the buffer or coating in turn surrounds the sides of the cladding. The buffer acts as a mechanical and chemical protective external layer for the cladding and core. The core acts together with the cladding to direct the radiation down the longitudinal axis of the core. This is possible because the core and cladding are made of materials that allow the light wave to move slightly faster through the cladding than the core. This has the effect of bending the radiation that is incident on the cladding to move into the core, thus projecting the radiation down the longitudinal axis of the core. This redirection is accomplished with little loss of energy and hence the fiber can deliver optical energy or thermal-optical energy for considerable distances.

Sometimes however it is desirable to have the optical energy leak out the sides of the optical fiber at selected sites along the fiber, rather than tapping the energy that projects out of the end of the fiber that is distal to the laser or other device that delivers the energy into the fiber at the proximal end.

The advantage of doing so might be to distribute the output over a relatively large area compared to that emerging from the distal end of the optical fiber. This would permit a vast number of detectors or optical fiber receivers to receive the energy and information and if required retransmit it. These detectors or rerouting optical fibers could be coupled with filters, well known to the art that would permit the tapping of specific frequencies from the leaking fiber.

The leakage from relatively large areas along the side of the fiber could be also be used to project photo-thermal energy to the area external to the fiber. This might be used to heat the inside of SMA tubes to either effect shape recovery as for example taught by Unsworth and Waram in U.S. Pat. No. 5,846,247 or to effect a stiffening of superlastic SMA tubes as taught by Unsworth, Waram and Adelman in U.S. Pat. No. 5,904,657. The side of the optical fiber might be treated around its entire circumference or around only a part of it. This would permit the selective projection onto parts of the interior of the tubes without recourse to mirroring or beveling the distal end of the core of the fiber. By causing the sides of the optical fiber to leak, a larger area of the tube or other material can be heated or treated with photo-optical or photo-thermal energy. This would be an advantage where a guidewire made of superlastic SMA could be heated along a relatively long length causing it to stiffen when heated and thus assisting the surgeon in advancing the wire through an occlusion. This heated SMA tube could also be used for ablative surgery, used to treat the walls of the heart for prevention of atrial fibrillation. Another use for an optical fiber thus treated would be for triggering light activated drugs. The larger area of projection would permit the site specific activation of a larger site which would speed the operation and avoid the necessity of relocating the optical fiber and catheter.

Alternatively, the leaks could be from the side of the fiber, that were of such a size that only particular frequencies could leak through the "holes" in the walls of the cladding. "Holes" in the cladding would permit passage of those frequencies that have wavelengths less than or equal to approximately twice the size of the hole with progressively less permissibility up to approximately four times the size of the "hole". "Holes", need not be actual holes in the cladding, but include any treated area of the same size, that causes the optical energy of that frequency not to refract back into the core in the manner it does on the untreated portions of the cladding. Typically this would be effected by lowering the speed though which energy of a desired frequency can pass through the cladding at this treated area below or equal to that speed which it travels through the core; or conversely, by increasing the speed with which the energy passes through the core, at that treated point. A method for creating these "holes" will be described below. These "holes" can be arranged, with the smallest toward the proximal end of the fiber and the larger "holes" near the distal end, such that specific frequencies could be tapped in succession, much like a coal or gravel sorter used in mines and quarries. While some shorter frequencies that should exit the smaller "holes", would inevitably pass by the smaller "holes", and emerge out of the further distal larger "holes", the output energy would be lower permitting selective filtering or setting the detector or detectors at the larger "holes" to detect only above a threshold set above that of the likely errant high frequency output. It should be noted that these "holes" need not be round, but can be of any convenient shape, so long as their dimensions act to filter out radiation of unwanted wave-lengths.

While brad gratings are used routinely in effecting some leakage from the side of the optical fiber, it is difficult to effect and generally allows for only very small areas of leakage. These gratings are created with masks that rapidly deteriorate when subjected to the imprinting laser light from a source external to the optical fiber that is being treated.

The method outlined in this invention includes the use of a laser that heats the cladding of the optical fiber in quick pulses that act to change the optical properties of the cladding sufficiently to leak at a predictable and even rate. The rapid application of pulses of heat followed by cooling periods is thought to alter the optical properties of the cladding or core or both and cause a leaking of energy from the core through the cladding to the space surrounding the fiber. When the buffer is left on the optical fiber and is burned away by the laser, the cladding may become contaminated or doped and thus its optical properties may deteriorate, thereby increasing the leaking of the photo energy from the core to the exterior of the optical fiber. This contamination or doping of the cladding by the application of the laser pulses in combination with the intimate presence of other chemicals makes possible the doping of specific parts of the cladding to permit specific frequencies of light to leak while maintaining the normal light transmitting properties for other frequencies. Such doping chemicals can be placed on the selected area of cladding (after the buffer has been removed) and the treating laser can then heat the cladding sufficiently to allow for the incorporation of the dopant into the cladding. These dopants that are frequency specific are well known to the art of photonics. Where the dopant is in vapor or plasma form, the procedure would of course need to be conducted in a suitable chamber. It should be noted that these methods work for polymer as well as glass cores, cladding and buffers or combinations of them.

Any treatment of the optical fiber than makes it leak will usually make it more brittle and susceptible to breakage if alter flexed, even if the buffer is reapplied. The method herein described includes a method for reducing breakage, but should breakage occur, maintains near normal light passage down the fiber.

DETAILED DESCRIPTION OF THE INVENTION

The method of rendering the leaky fiber leaky is simple and inexpensive especially when the optical fibers are transmitting photo-thermal energy comprised largely of infrared. For example the use of an inexpensive engraving/cutting type "X/Y" moving platen laser station, such as the Trotec 25 watt "Speedy" laser is ideal for creating large leaky sections on an optical fiber. While the buffer might for some applications be removed chemically prior to laser treatment, this is often not necessary as the laser heat removes the buffer as it treats the cladding and core or both below. Other dopants could as described above be placed in intimate contact with the part of the optical fiber to receive laser treatment.

The optical fiber can be placed on the work table and that part of the optical fiber that needs to leak can be treated by passing the laser beams in a series of parallel paths approximately normal to the longitudinal axis of the fiber. Such series of paths forming a treated patch along the optical fiber. The paths could of course be at other angles to the longitudinal axis, including parallel, or even crosshatched to vary the amount of light that is emitted. The angles and number of passes back and forth will be governed by the amount of light that is required to be emitted. Spots that create "holes" can also be imparted into the laser by short and pin-point pulses as the laser tracks across the optical fiber. The advantage of this method is that by varying the power of the laser, the pulse frequency and the speed with which is tracks across the fiber, the effect on the cladding can be varied and thus the amount of light emitted. By varying these factors, a patch of fiber can have a pattern of brighter and less bright emitting parts as required. The amount of light that is emitted from the side of the fiber will depend on the type of fiber chosen, the frequency or frequencies of light that travel along the fiber as well as the treatment options chosen. The treatment options chosen will initially be a matter of trial and error to match the operator's requirements with the materials at hand.

As an example of a treatment of an optical fiber an optical fiber designed to carry photo-thermal energy (mainly infrared) can be easily be made leaky by using the Trotec "Speedy" machine, or similar machine. In this case a very even output over an inch of the optical fiber was obtained. Other tests using slightly different parameters gave an even output over approximately four inches. Other methods have produced very short distances of leakyness, perhaps a quarter of an inch. Using the Totech machine (a machine of similar design could also be used), the tip of the optical fiber was made evenly leaky by passing the laser normal to the longitudinal axis of the optical fiber at the rate of approximately 9.2 inches per second, back and forth slightly wider a path than the width of the fiber, to ensure there are no parts of the fiber that do not get treated. The $CO_2$ laser output was set at the full 25 watts at 1000 Hertz pulse rate. Each succeeding pass was separated by approximately 2,000 of an inch, giving approximately 500 passes of the laser, normal to the longitudinal axis of the fiber and evenly spaced over an inch along the longitudinal axis of the fiber. The separation between passes or the power or both can be varied from the first passes to the last to vary the leakage produced, or to compensate for the reduced power available to leak at the distal section of the fiber. This varied output can create patterns suitable for display or for reading bar codes or other printed matter. These parameters will of course require adjustment depending upon the optical fiber used and the frequency of energy traveling down the optical fiber. It is important that the power setting be such that the fiber is not cut. The best way to calibrate the power setting is to connect the optical fiber (or a test fiber in an array, if many are treated at once) to the laser with which it will actually be used. This way the output can be directly tested as the parameters are set, either visually or with instrumentation, and perhaps a feedback controller.

This method is fast and avoids the necessity of using expensive high frequency lasers and masks. This method also allows for hundreds of fibers to be lined up side by side and to be treated at once. In this case the truck travels across the entire array of fibers on each pass. The truck housing the laser courses back and forth normal to the longitudinal axes of the fibers along a traveling platen whose longitudinal axis is normal to the longitudinal axes of the fibers, the movable platen moving approximately parallel to the axes of the fibers.

In many cases the fiber can be treated on one side only, as the cladding and perhaps the core can be altered around part or all of its circumference by appropriately choosing the power, frequency, pulse rate, path separations, and speed of travel of the laser. In some cases only a part of the circumference needs to project light or leak in which case setting are chosen that will restrict the effect of the laser to the spot on which the laser actually projects its photo-thermal energy, usually lower power settings.

Such engraving/cutting laser systems can include a rotating tool that holds and rotates the optical fiber so that it rotates about its longitudinal axis, while the laser applies photo-thermal energy in the same manner as described above.

This type of laser can also form small patches, referred to above as "holes", by pulsing on spots along the fiber rather than being turned on while the truck travels along the platen creating paths. These patches can be doped as described above, or simply heated by the treating laser. In the case where the "holes" are meant to selectively leak light of higher frequencies, a laser of higher frequency will be required and a platen having greater precision than the Trotec "Speedy" machine.

Optical fibers can be directly attached to these "holes" by adhesives or fixtures, to route the photo-optical or photo-thermal energy traveling down the optical fiber to branch in many directions. The holes can also be connected directly to detectors to read the information contained in the energy emitted from the holes. A further possibility is to dope the holes as described above with materials that change their optical properties in the presence of another laser beam that turns on and off the spot by alternatively applying or not applying energy to that spot. The said changed optical properties would make the cladding behave normally when, for example, the light was not shone on the spot, but become a slower medium when the laser light was shone on the spot, causing the beam traveling down the optical fiber to leak through the cladding at that point. The treatment of the optical fiber described could thus act as a branching and switching network.

When the treatment is complete a transparent buffer may in certain circumstances be placed over the treated area to protect it from environmental degradation. If this is desirable, a clear silicone or other flexible polymer coating that shrinks when it sets may be for certain applications be useful. Once such acrylic polymer is available from Golden Artists Colors, regular gel medium. This material has been found to shrink which compresses the optical fiber when it sets. This has the advantage that if the optical fiber subsequently breaks, the compression both radially and longitudinally along the fiber acts to hold the broken fiber ends together and to minimize the loss of performance of the optical fiber. This treatment of the fiber is not of course limited to that part of the fiber subject to flexure. In the case where the fiber buffer need not transmit the leaking energy, non transmissive, polymers could be used. Provided they shrink and act to compress the optical fiber as described above.

SUMMARY OF THE DRAWINGS

FIG. 1 is a perspective view of the optical fiber 1 with a section 5 that has been made to be leaky, which allows the radiation 6 to pass approximately normal to the longitudinal axis of the optical fiber 1.

FIG. 2 and FIG. 3 are cross-sectional views of an optical fiber, which illustrates a section normal to the longitudinal axis of the optical fiber, such fibers being treated at location 9 with a laser 7 that changes the chemistry of the various component parts of the fiber 1, thereby causing the fiber to become leaky.

FIG. 5. is a perspective view of a leaky fiber that has a means to selectively channel streams of information, on the basis of different wave-lengths, as well as means for switching the output from the leaky fiber. Also, illustrated is a method of tapping information from the side of the fiber 1, rather than from the end of the fiber 1.

DETAILED DESCRIPTION OF DRAWINGS

Figure 4:
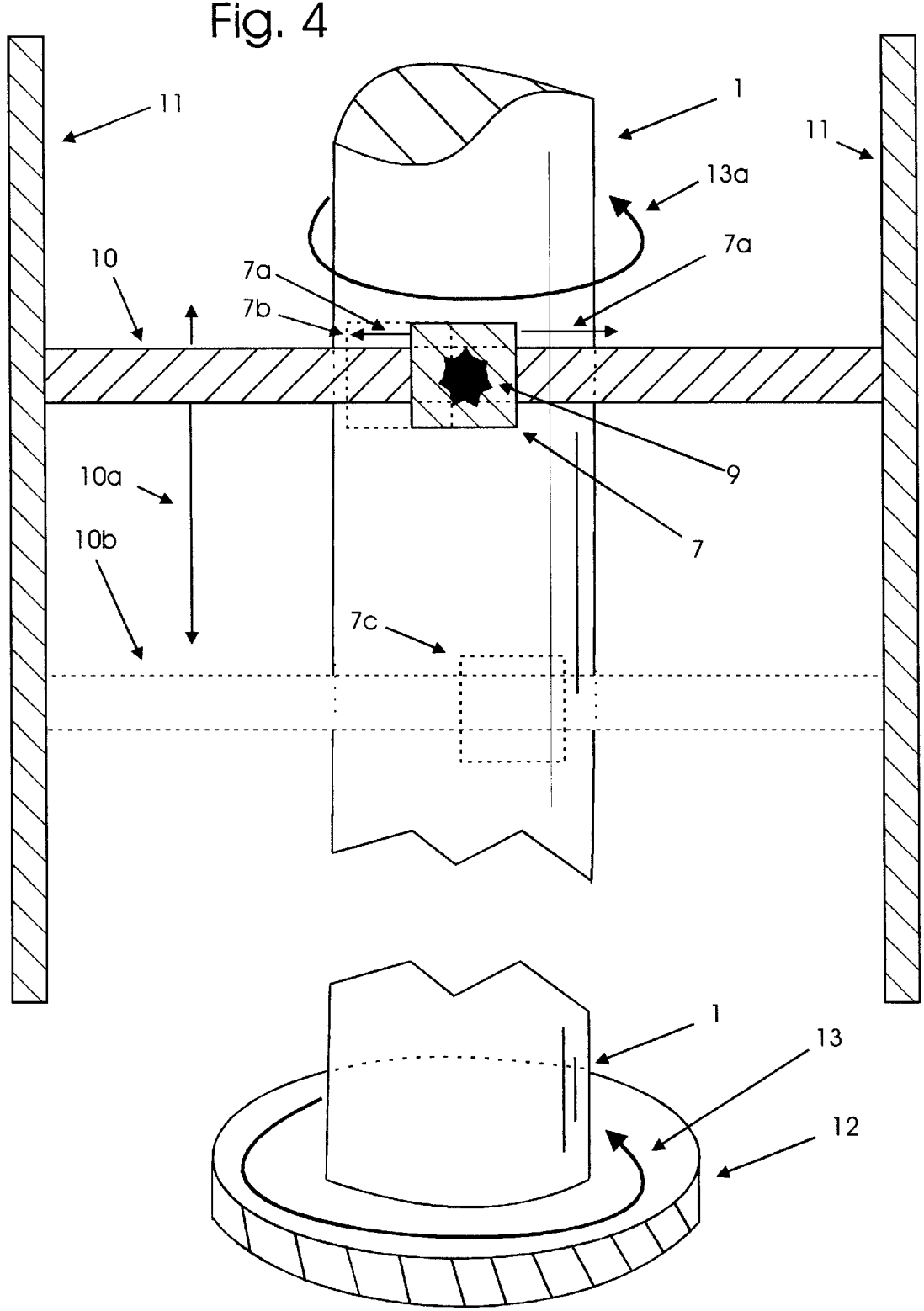
FIG. 4 is a perspective, top view of a system that automates the method of treating the optical fibers 1 to make them leaky, and also illustrates a means 12 by which the fiber can be rotated 13 relative to the position of the laser 7, such that the optical fiber 1 is treated around selective parts of its circumference.

FIG. 1 illustrates an optical fiber 1 that has a leaky section 5 that permits radiation 6 to leak from the core 4 through the cladding 3 and in some cases buffer 2 (if transparent) in a direction normal to the longitudinal axis of the optical fiber.

FIG. 2 and FIG. 3 illustrate the imposition of the treating laser beam 8 delivered by laser 7 on the cladding and to some extent on the buffer, (as illustrated in FIG. 2) and on the core (as illustrated in FIG. 3). The exact location of the heating will vary depending upon the parameters chosen and the fiber treated. In some cases the entire fiber cross-section will be heated, while in other cases only spots or holes will be created.

FIG. 4 illustrates a preferred embodiment of the invention that comprises a "X/Y" moving platen system, to which the laser is attached and which in turn applies photo-thermal energy to selected parts of the optical fiber 1. Platen 10 moves along tracks 11 in a direction parallel 10a to the longitudinal axis of the said tracks 11. In the case illustrated in FIG. 4 the platen 10 moves to position 10b.

Laser platen 7 runs along and parallel 7a to the longitudinal axis of platen 10, and is shown in the FIG. 4 moving to position 7b and 7c. Using this preferred embodiment the laser 7 can direct photo-thermal energy 9 anywhere chosen on the upper surface of the optical fiber. While FIG. 4 shows only one fiber, many hundreds of fibers can be treated simultaneously if fed in parallel along the bed of this preferred embodiment. FIG. 4 also illustrates a rotating table 12, which may be used in combination with the "X/Y" table. While for some applications a treatment from one side of the fiber would suffice, for others spots around the circumference of the fiber may need treatment. While the preferred embodiment uses a rotating table to rotate the fibers, other means of rotating them on the bed of the device are well known to the art and form a part of this invention. These other means would include rollers or belts which would rotate or roll many fibers at once. While FIG. 4 illustrated flat platens, it is to be understood that other preferred embodiments would utilize circular or semi-circular platens that would envelope the fiber(s).

FIG. 5 illustrates an optical fiber that has had "holes" as described above created by the method herein described. In the case the "holes" 5a emit parts of radiation 14 in discrete frequency envelopes imposed by the size of the "holes" 6. The holes in this case form an array that allows higher frequencies to leak proximal to the energy source 14 and successively lower frequencies to leak progressively in a distal direction to the source 14 as the holes become progressively larger. FIG. 5 also illustrates a preferred embodiment in which an optical fiber 15 is attached or in communication with a "hole" which allows the radiation 6 to be directed away from the primary optical fiber 1. While FIG. 5 shows only one such optical fiber 15 many might be attached in a similar fashion. Also, detectors 17 or other instruments might be attached as well. FIG. 5 also illustrates a preferred embodiment where a laser 16 stimulates a filter that is incorporated in the "hole" 6. These light gate filters are well known to the art and in combination with side-firing optical fiber 1, the optical fiber could act as a high capacity switch. If the branching optical fibers were themselves leaky, a laser 16a could turn off and on the radiation 6 passing down optical fiber 15. It should be noted that while FIG. 5 shows the radiation 14 passing into the fiber 1 and exiting the holes 6 and fiber 15, it should be noted that other preferred embodiments of the invention include those cases where some or all of the radiation passes in the opposite or other directions. Detector 18 in FIG. 5 might for example detect patterns seen by the array of holes 5a.

While this patent describes some preferred embodiments of the invention it is to understood that it is not limited to those particularly described but encompasses all those that come within the ambit of the principles that comprise the invention.

I claim:

1. A method that causes optical fibers to side fire or leak by directing photo-thermal energy produced by a laser onto the part or parts of the optical fiber that are intended to side fire or leak, by moving the photo-thermal emitter along on a computer controlled moving platen, relative to the adjacent optical fiber, such that the emitter projects photo-thermal energy onto the optical fiber at programmed points, thereby changing the chemical properties of those parts of the optical fiber, and thereby causing the optical fiber at those points of change to leak or side-fire.

2. The method of claim 1, wherein the amount of radiation that passes through the side of the fiber at any given point, or its leakiness, is varied by controlling the amount of photo-thermal energy that is projected onto that point by the emitting laser.

3. The method of claim 1, wherein multiple ports or "holes" are created in the side of the optical fiber,
   that allow the optical fiber to side fire or be leaky
   by projecting photo-thermal energy onto discreet points on the optical fiber, thereby forming the ports or "holes".

4. The method of claim 1, wherein the radiation passing through the sides of the said optical fiber can be put in communication with detectors, instruments or other optical fibers to channel the radiation in many directions.

5. The method of claim 1, wherein the photo-thermal energy can be applied to the optical fibers in patterns
   that chemically alter the optical fiber in patterns
   which results in the optical fibers having patterned side firing output.

6. A method for reducing breakage of the treated and untreated parts of the optical fiber,
   wherein the fibers are coated with a transmissive coating, and
   the coating shrinks after application, compressing the optical coated optical fiber, and
   such compression thereby reduces the tendency of the fiber to break when stressed.

* * * * *